United States Patent [19]
Maduzia et al.

[11] Patent Number: 5,488,408
[45] Date of Patent: Jan. 30, 1996

[54] SERIAL DATA CHANNEL METERING ATTACHMENT FOR METERING CHANNELS TO WHICH A RECEIVER IS TUNED

[75] Inventors: Kenneth S. Maduzia, Holiday; Kenneth J. Frett, Crystal Beach; James J. Vitt, Dunedin, all of Fla.

[73] Assignee: A.C. Nielsen Company, Northbrook, Ill.

[21] Appl. No.: 215,899

[22] Filed: Mar. 22, 1994

[51] Int. Cl.⁶ .................................................. H04N 7/10
[52] U.S. Cl. ........................... 348/2; 455/2; 455/67.1; 455/226.1; 455/226.4; 348/5; 348/192
[58] Field of Search ................................. 348/1, 2, 4, 5, 348/3, 178, 192, 180; 455/2, 67.1, 67.7, 226.1, 226.4, 186.1; 358/84; 340/825.04, 825.03; H04N 7/10

[56] References Cited

U.S. PATENT DOCUMENTS

| | | | |
|---|---|---|---|
| 4,723,302 | 2/1988 | Fulmer et al. | 455/2 |
| 4,885,632 | 12/1989 | Makey et al. | 358/84 |
| 5,243,593 | 9/1993 | Timbs | 370/58.1 |
| 5,379,404 | 1/1995 | Rasor | 395/500 |

*Primary Examiner*—Victor R. Kostak
*Assistant Examiner*—Juan G. Acosta
*Attorney, Agent, or Firm*—Marshall, O'Toole, Gerstein, Murray & Borun

[57] ABSTRACT

An attachment is arranged to permit channel metering of any of a variety of receivers which incorporates serial data communication buses. The attachment includes a computer for reading channel information carried by the serial data communication bus of a monitored receiver, a field programmable gate array which may be programmed to customize the attachment to the serial data communication bus arrangement and to the data format of any of a wide variety of receivers, and an isolator to isolate the attachment from the monitored receiver.

36 Claims, 11 Drawing Sheets

SERIAL DATA CHANNEL METERING ATTACHMENT FOR METERING CHANNELS TO WHICH A RECEIVER IS TUNED

TECHNICAL FIELD OF THE INVENTION

The present invention relates to an attachment and system for metering the use of digital entertainment appliances such as digital televisions, radios, video cassette recorders, and the like.

BACKGROUND OF THE INVENTION

Various arrangements have been provided in the past to determine the channel to which a receiver is tuned so that audience share information can be gathered. This audience share information estimates the number of people receiving a program as a percentage of the total audience receiving programs over the same media during the same time slot.

In one example of such arrangements, diaries are furnished to cooperating households having televisions and/or video cassette recorders (VCRs). These diaries are filled out manually by those people who watch or record television programs in the cooperating households. Diaries have several drawbacks, including lack of attention and human error in making diary entries.

Other known systems have been designed to reduce human intervention in the metering of channels to which receivers are tuned. Such channel metering systems typically gather such information as the on-off condition of the receivers being monitored and the identity of the channels to which these receivers are tuned while the receivers are in the on condition. These systems generally store this information for later transmission over telephone lines to a central computer.

In one such channel metering system, the position of a tuning element of a monitored receiver, such as a tuning dial of a receiver, is determined in order to identify the channel to which the monitored receiver is tuned. This system requires a direct mechanical coupling to the tuning element of the monitored receiver. While such mechanical systems are reliable, the direct mechanical coupling of this system requires skilled installation practices. Also, variations in the mechanical configurations of tuner elements between various receivers require a large assortment of adapters to implement direct mechanical couplings. Moreover, most modern day receivers use electronic tuning rather than mechanical tuning so that mechanical coupling arrangements are not practical.

In another known channel metering system, the tuning voltage across a varactor diode of a voltage tunable receiver is monitored in order to determine the channel to which the voltage tunable receiver is tuned. However, this channel metering system is applicable only to voltage tunable receivers.

In yet another known channel metering system, monitoring signals are injected into the tuner of a monitored receiver. Each injected monitoring signal corresponds to one of the channel frequencies to which the monitored receiver can be tuned. The monitoring signals are injected in order of either increasing or decreasing channel frequencies. By detecting which of the injected monitoring signals passes through the tuner of the monitored receiver, the channel to which the monitored receiver is tuned may be determined. In this type of system, care must be exercised to ensure that the injected monitoring signals do not interfere with the program being perceived; otherwise, the enjoyment by the audience of the program may be impaired.

Furthermore, current metering technology is based on the assumption that all states of a tunable receiver, such as that used in a television, a radio, a video cassette recorder, or the like, may be staticly determined. This assumption means, for example, that a unique voltage or combination of voltages, or a unique tuning element position, must be observable for each state of the tunable receiver. Although this assumption has been valid for receivers using analogue technology, it is less valid for digital receivers. Decreasing costs in digital integrated circuit technology has allowed receiver manufacturers to design and manufacture digital receivers. Thus, complex analogue control circuitry can be replaced with a set of integrated circuits or even with a single integrated circuit. The resulting reduction in the number of components of digital receivers increases reliability, reduces manufacturing costs, and simplifies the design of such receivers. Accordingly, the number of digital receivers available to viewing and listening audiences has grown dramatically in recent years. Existing metering systems, which are designed to primarily monitor analogue receivers, are not capable of easily and efficiently monitoring the channels to which such digital receivers are tuned.

SUMMARY OF THE INVENTION

Digital receivers, for the most part, have a modular design. In this modular design, a central microprocessor communicates with a plurality of receiver components over a serial data communication bus in order to coordinate the operation of the receiver components. Therefore, additional functionality may be easily provided in such digital receivers by simply interfacing additional add-on components to the serial data communication bus and updating the control software of the control microprocessor to reflect the additional components. Moreover, the serial data communication bus may have different configurations depending upon the communication protocol implemented by the receiver manufacturer. The present invention is directed to a channel metering attachment which monitors the serial data communication bus of a digital receiver in order to determine the channel to which the digital receiver is tuned and, if desired, to determine other functions of the receivers as well as. Also, the channel metering attachment of the present invention may be customized to most or all of the different serial data communication bus configurations used in digital tunable receivers.

In accordance with one aspect of the present invention, a channel metering attachment is provided for metering channels to which a receiver is tuned. The receiver may be of the type having a plurality of components and a bus which carries serial data between the components. The channel metering attachment includes a channel determining apparatus for determining, from the serial data carried by the serial data communication bus of the receiver, a channel to which the receiver is tuned. An output apparatus of the channel metering attachment is connected to the channel determining apparatus, and provides an output identifying the channel to which the receiver is tuned.

In another aspect of the present invention, a channel metering system includes a receiver for receiving a plurality of broadcast signals over a plurality of channels. The receiver has a serial data communication bus for carrying serial data between components of the receiver. A channel determining apparatus determines, from the serial data carried by the serial data communication bus, a channel to which the receiver is tuned. The channel determining apparatus is connected to the serial data communication bus of the receiver. An output apparatus is connected to the channel determining apparatus, and provides an output identifying the channel to which the receiver is tuned.

In accordance with yet another aspect of the present invention, a channel metering attachment is provided for metering channels to which a selected receiver is tuned. The selected receiver is selected from among a plurality of different receivers. Each of the plurality of different receivers has a serial data communication bus for carrying serial data between components thereof. The channel metering attachment includes a channel determining apparatus for determining the channel to which the selected receiver is tuned. The channel determining apparatus is connected to the serial data communication bus of the selected receiver, and determines the channel to which the receiver is tuned in response to the serial data carried by the serial data communication bus of the selected receiver. A customizing apparatus customizes the channel determining apparatus to the selected receiver so that the serial data carried by the serial data communication bus of the selected receiver can be decoded by the attachment. An output apparatus of the channel metering attachment provides an output identifying the channel to which the selected receiver is tuned.

BRIEF DESCRIPTION OF THE DRAWING

These and other features and advantages will become more apparent from a detailed consideration of the invention when taken in conjunction with the drawing in which.

DETAILED DESCRIPTION

Figure 1:
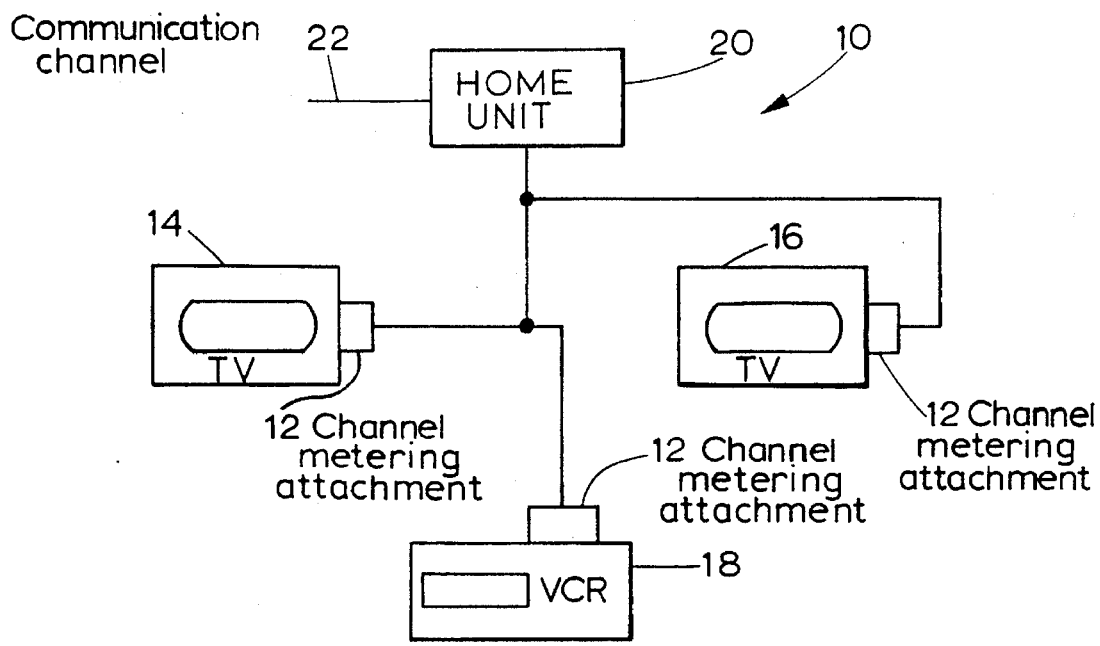
FIG. 1 is a block diagram illustrating a channel metering system in which the channel metering attachment of the present invention may be used.

As shown in FIG. 1, a metering system 10 includes a plurality of channel metering attachments 12 each of which monitors one of a variety of tunable receivers within a household. For example, one channel metering attachment 12 monitors the channels to which a first television receiver 14 may be tuned, another channel metering attachment 12 monitors the channels to which a second television receiver 16 may be tuned, and yet another channel metering attachment 12 monitors the channels to which a video cassette recorder 18 may be tuned. Because each of the tunable receivers 14, 16, and 18 may have different serial data communication bus configurations and different data formats, the channel metering attachments 12 must preferably be programmable in order to customize each channel metering attachment 12 to the specific tunable receiver which it monitors.

Each of the channel metering attachments 12 is connected to a home unit 20. The channel metering attachments 12 may be connected to the home unit 20 by way of a hard wire connection, by way of the power line carriers of the household in which the metering system 10 is installed, by way of infrared communication channels, or the like. The home unit 20 collects and stores the channel, on-off, and other information related to the tuning of the receivers 14, 16, and 18, and periodically communicates this information to a central facility over a communication channel 22. The communication channel 22 may be the public switched telephone system, a microwave communication system, or any other suitable communication system. The home unit 20 may be any device which is currently used in channel metering systems and which collects information from channel meters for periodic transmission to a central computer.

Figure 2:
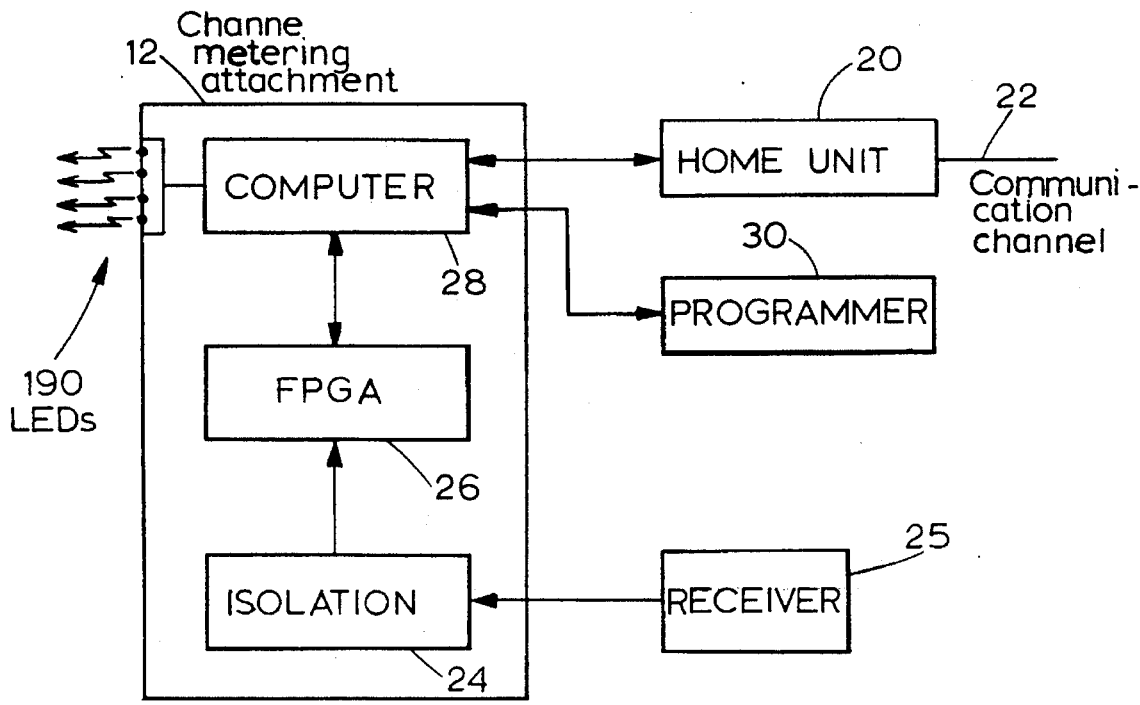
FIG. 2 is a block diagram illustrating the preferred embodiment of the channel metering attachment of the present invention as well as the manner in which it is connected in the channel metering system of FIG. 1.

As illustrated in FIG. 2, a channel metering attachment 12 may include an isolation circuit 24 for receiving suitable inputs from a monitored receiver 25, such as the first television receiver 14, the second television receiver 16, or the video cassette recorder 18. The isolation circuit 24 provides isolation between the signals of the monitored receiver 25 and signals of the channel metering attachment 12. The isolation circuit 24 receives the channel, on-off, and other information from the monitored receiver 25, and provides that information to a field programmable gate array 26 of the channel metering attachment 12.

The field programmable gate array 26 is programmable in order to customize the channel metering attachment 12 to any of a plurality of digital tunable receivers. Thus, the channel metering attachment 12 can be used to monitor nearly any format of serial digital data carried by nearly any configuration of serial data communication buses employed by monitored receivers. The field programmable gate array 26 is connected to, and communicates with, a computer 28 of the channel metering attachment 12. The computer 28 of the channel metering attachment 12 is also connected to the home unit 20.

At the time that the metering system 10 is installed within a cooperating household, the computer 28 of each channel metering attachment 12 may be connected to a programmer 30. The programmer 30 may be used to program the field programmable gate array 26 of each channel metering attachment 12 in order to customize each channel metering attachment 12 to the particular protocol, serial communication data bus, and serial digital data format of the monitored receiver to which each such channel metering attachment 12 is connected. Thus, each channel metering attachment 12 shown in FIG. 1 may be customized for its corresponding first television receiver 14, second television receiver 16, and video cassette recorder 18.

The programmer 30, for example, may be a personal computer which stores the necessary configurations for the field programmable gate array 26 so that a channel metering attachment 12 may be customized to the various monitored receivers which may be encountered in cooperating households. At the time of installation, therefore, an installer merely connects the programmer 30 to the computer 28 of the channel metering attachment 12 in order to download the selected configuration to thereby properly program the field programmable gate array 26.

Figure 3A:
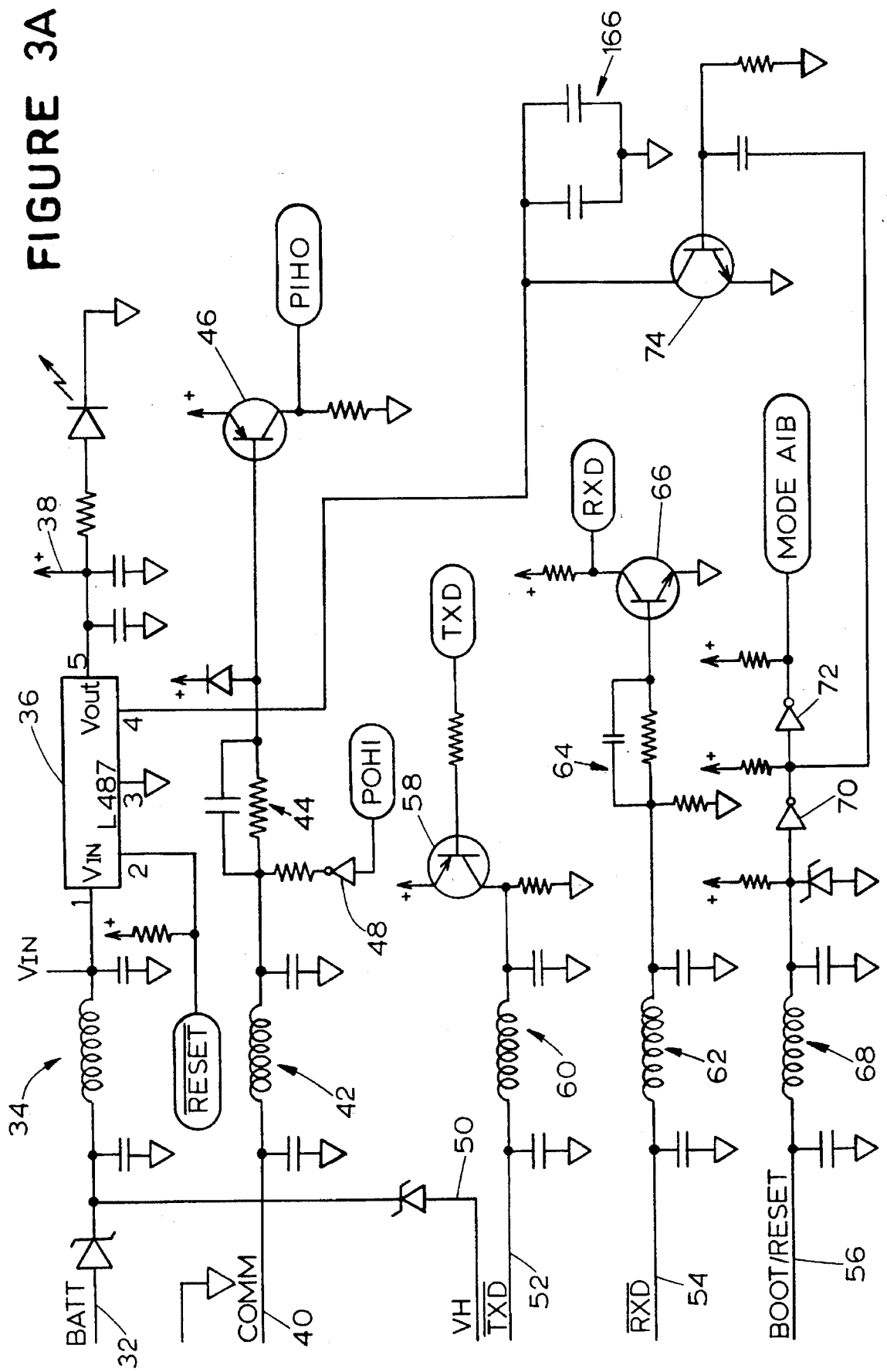
FIGS. 3A–3J are schematic diagrams illustrating in greater detail the channel metering attachment shown in FIG. 2.

The circuit illustrated in FIG. 3A connects the computer 28 to the home unit 20. Power for the channel metering attachment 12 is provided by the home unit 20 over an input line 32. This power is supplied through a filter 34 to a voltage regulator 36. The output of the voltage regulator 36 is a source terminal 38 which provides power to the other positive terminals shown in FIGS. 3A–3J.

Data is communicated between the home unit 20 and the channel metering attachment 12 over a communication line 40. The communication line 40 is connected through filters 42 and 44 to the input of an invertor 46. The output of the invertor 46 is connected through a terminal PIHO to a parallel I/O port A of the computer 28, as shown in FIGS. 3A and 3G.

Data is communicated by the channel metering attachment 12 to the home unit 20 over the same communication line 40. Accordingly, data from the parallel I/O port A of the computer 28 is supplied over a terminal POHI to the input of an invertor 48. The output of the invertor 48 is connected through the filter 42 to the communication line 40.

The programmer 30 is connected to the computer 28 of the channel metering attachment 12 by way of lines 50, 52, 54, and 56. The line 50 may provide alternative power to the channel metering attachment 12 from the programmer 30 during the time that the programmer 30 is connected to the channel metering attachment 12.

Data is communicated by the channel metering attachment 12 to the programmer 30 over the line 52. A parallel I/O port D of the computer 28 of the channel metering attachment 12 supplies this data over a terminal TXD to an input of an invertor 58. The output of the invertor 58 is connected through a filter 60 to the line 52.

Data is communicated by the programmer 30 to the channel metering attachment 12 over the line 54. The line 54 is connected through a filter 62 and through a filter 64 to an input of an invertor 66. The output of the invertor 66 is connected over a terminal RXD to the parallel I/O port D of the computer 28.

Finally, the line 56 provides a BOOT/RESET signal from the programmer 30 over a terminal MODE A/B to the MODA and MODB pins of the computer 28. The BOOT/RESET signal is supplied to the terminal MODE A/B through a filter 68, an invertor 70, and an invertor 72. The BOOT/RESET signal on the line 56 is also provided through the filter 68, through the invertor 70, and through an invertor 74 to the voltage regulator 36.

Figure 3B:
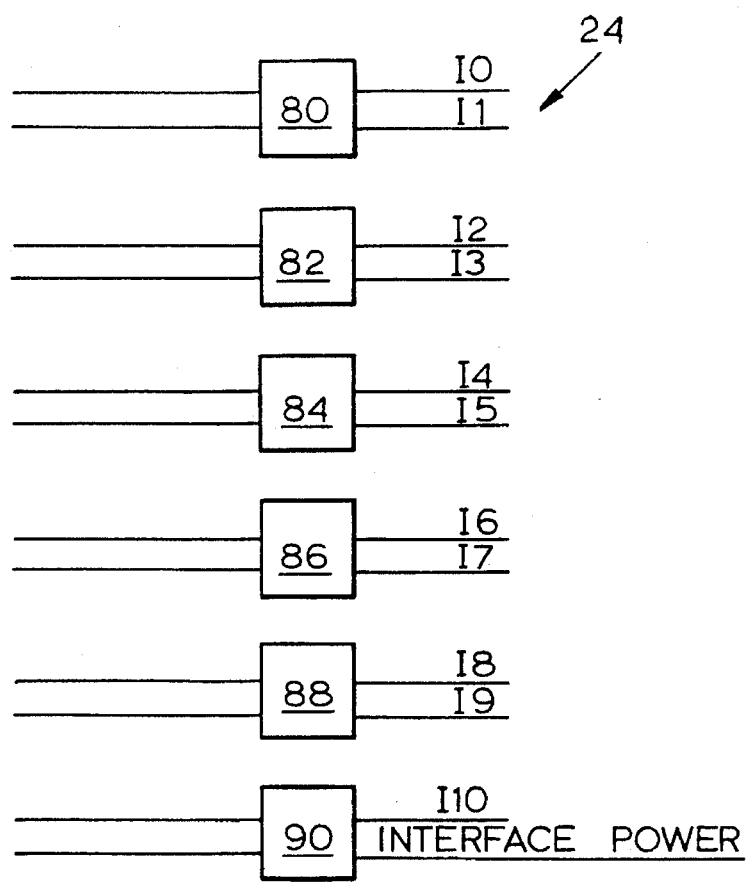
Figure 3F:
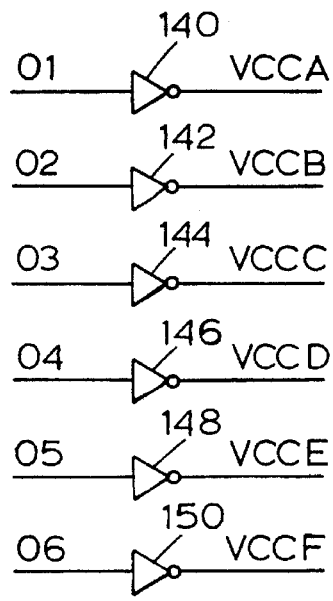

FIG. 3B illustrates the isolation circuit 24 in additional detail. As shown in FIG. 3B, the isolation circuit 24 includes a plurality of isolators 80, 82, 84, 86, 88, and 90. A plurality of isolators are provided so that the channel metering attachment 12 may be connected to different receiver serial data communication bus configurations. Furthermore, one or more of the isolators 80–90 may be specifically arranged for higher data rates, one or more of the isolators 80–90 may be arranged for lower data rates, and the isolator 90 may be arranged to sample power supplied to one of the tunable receivers 14, 16, and 18 over the connection INTERFACE POWER so that the corresponding channel metering attachment 12 may determine whether the tunable receiver is on or off.

Figure 3C:
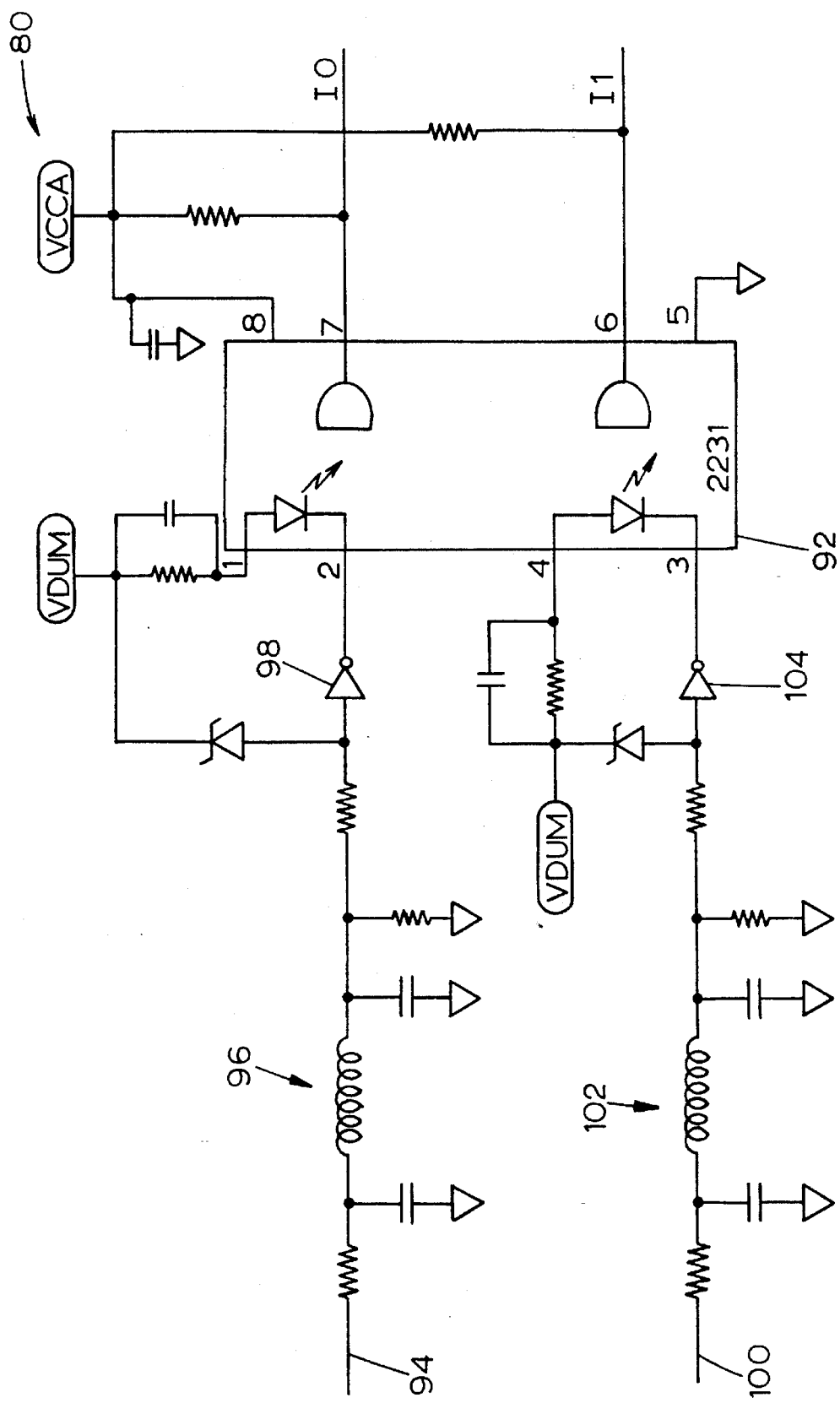

FIG. 3C illustrates an isolator which is arranged for higher data rates. This isolator, which may be, for example, the isolator 80 shown in FIG. 3B, includes an optical isolator 92 having two channels. A first of the two channels of the optical isolator 92 receives an input over an input line 94. The input line 94, which may be connected to one line of a receiver serial data communication bus, is connected through a filter 96 and an invertor 98 to the optical isolator 92. This first channel of the optical isolator 92 has an output, I0, which is connected to one input pin of the field programmable gate array 26 as shown in FIG. 3H.

A second of the two channels of the optical isolator 92 receives an input over an input line 100. The input line 100, which may be connected to another line of the receiver serial data communication bus, is connected through a filter 102 and an invertor 104 to the optical isolator 92. This second channel of the optical isolator 92 has an output, I1, which is connected to another input pin of the field programmable gate array 26.

Figures 3D, 3E:
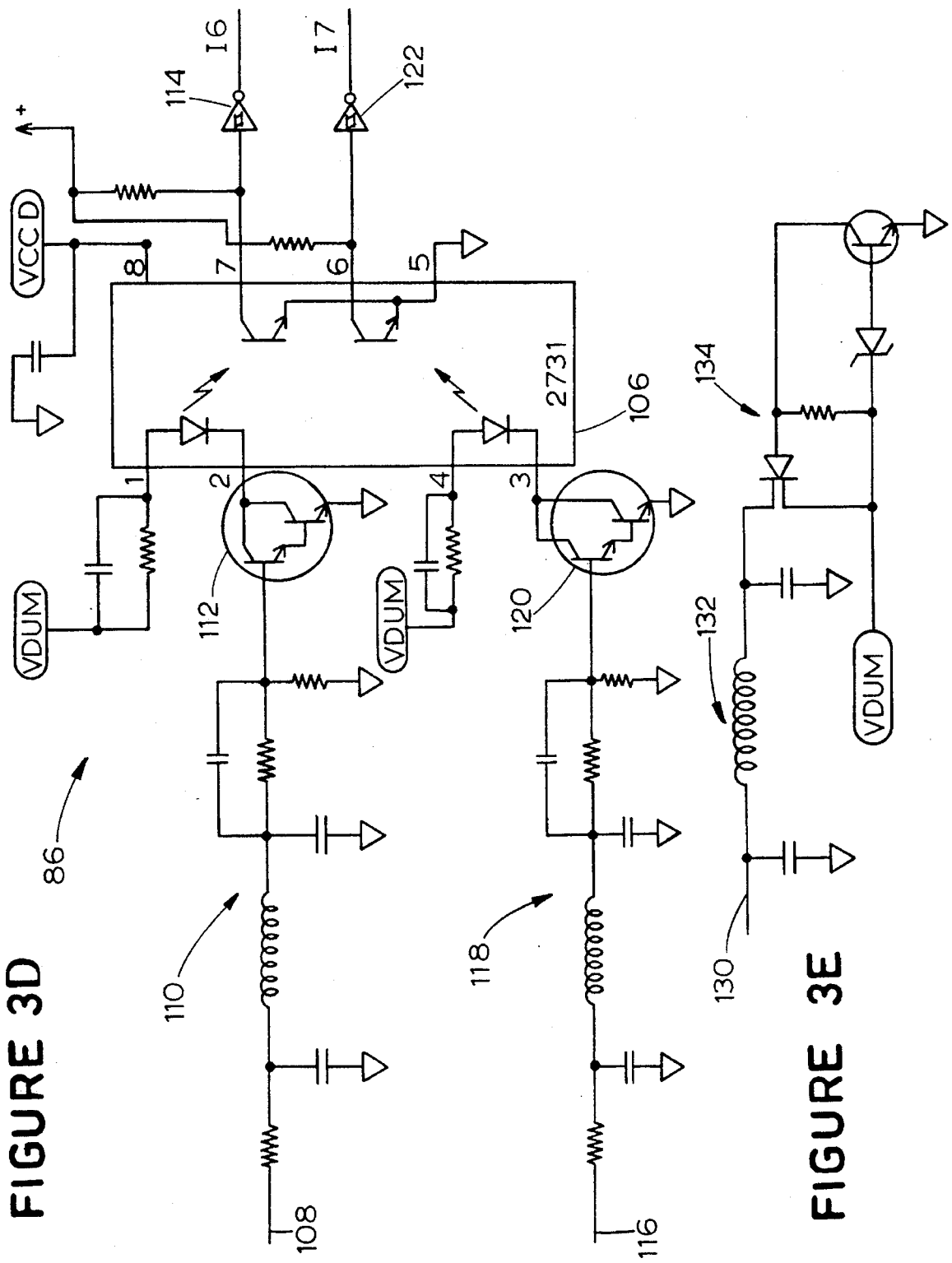
Figure 3G:
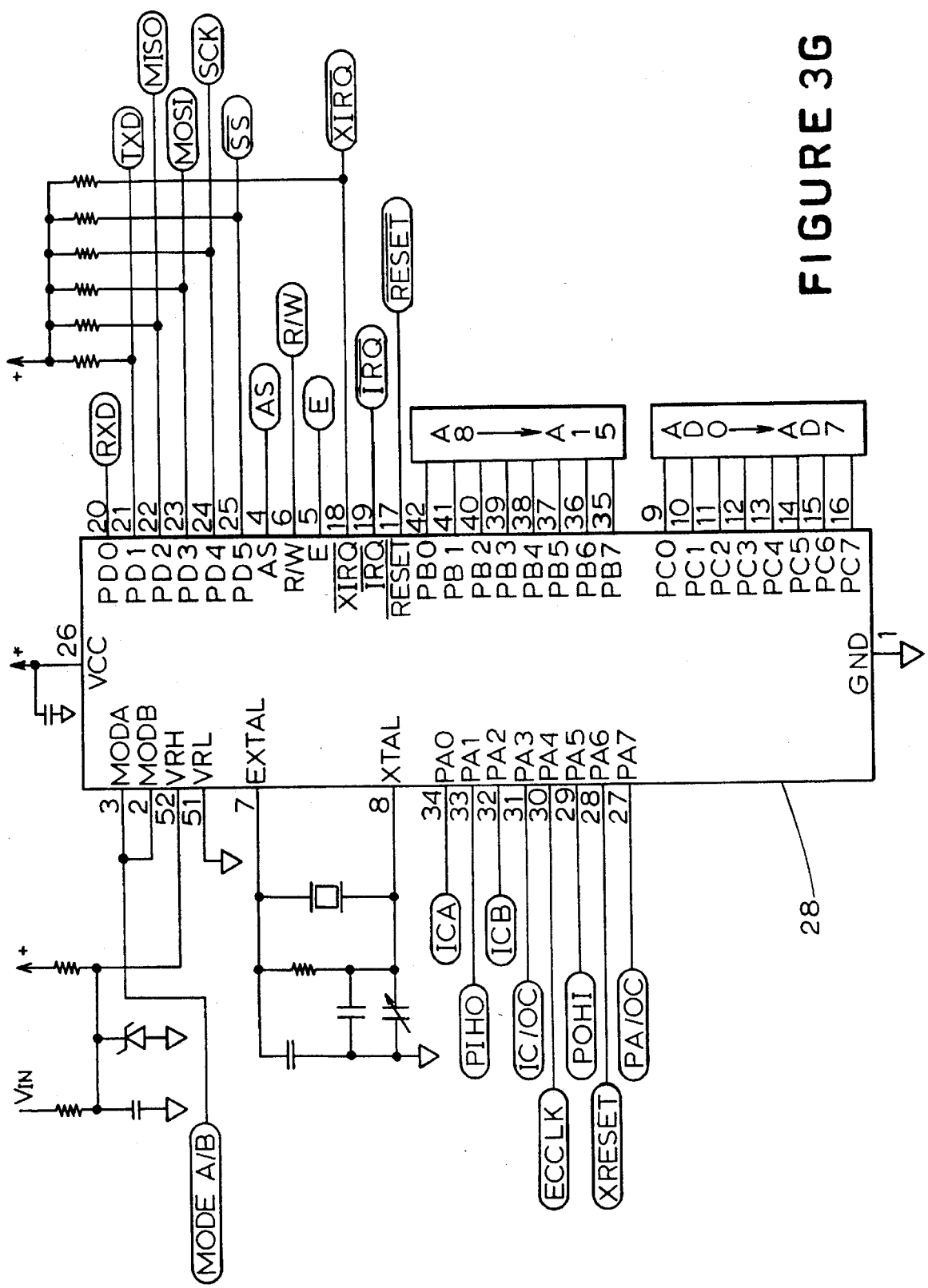
Figure 3H:
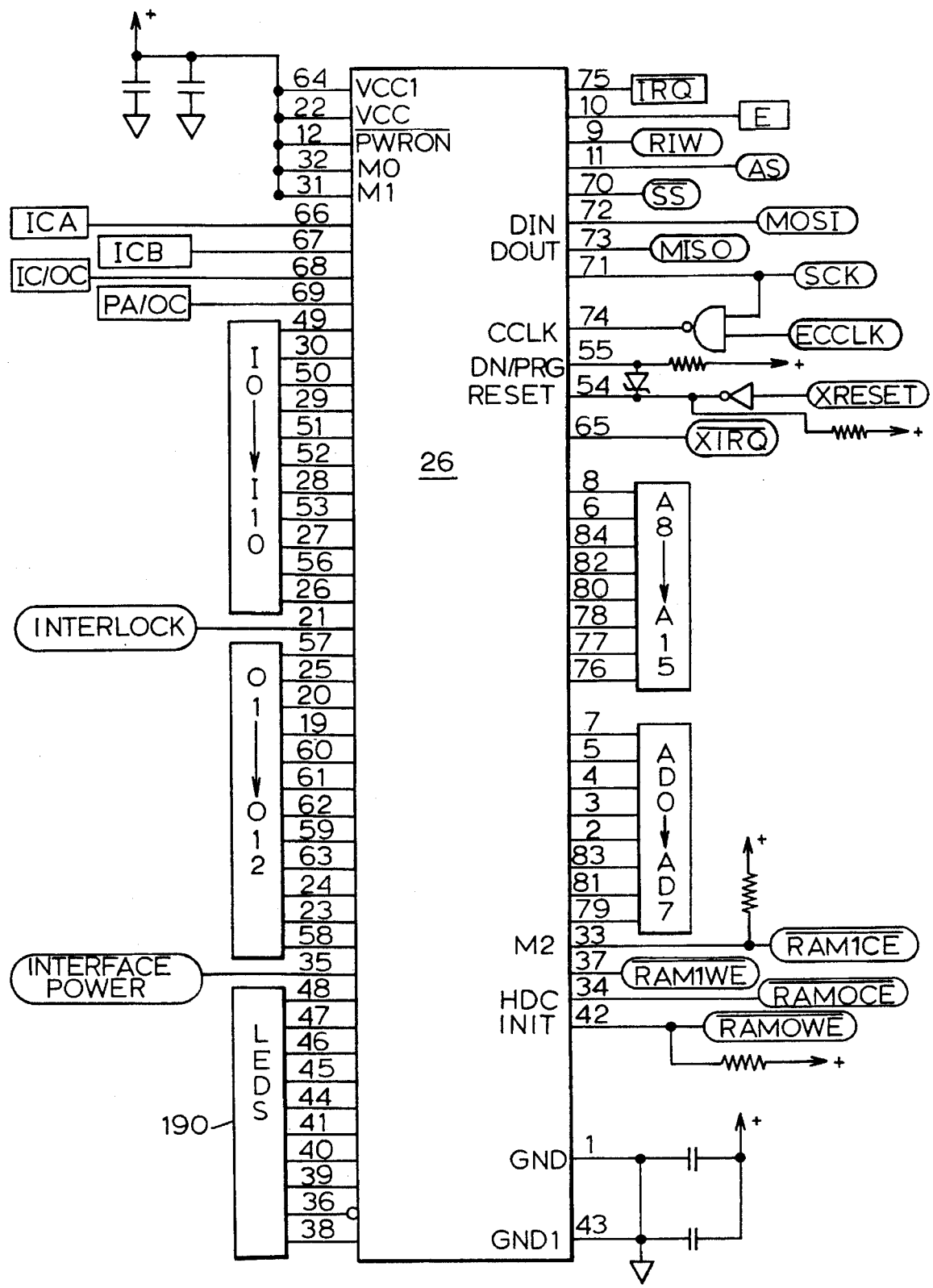

FIG. 3D illustrates an isolator which is arranged for slower data rates. This isolator, which may be, for example, the isolator 86 shown in FIG. 3B, includes an optical isolator 106 having two channels. A first of the two channels of the optical isolator 106 receives an input over an input line 108. The input line 108, which may be connected to one line of a receiver serial data communication bus, is connected through a filter 110 and an invertor 112 to the optical isolator 106. This first channel of the optical isolator 106 provides an output through an invertor 114 to an output I6 which is connected to an input pin of the field programmable gate array 26.

A second of the two channels of the optical isolator 106 receives an input over an input line 116. The input line 116, which may be connected to another line of the receiver serial data communication bus, is connected through a filter 118 and an invertor 120 to the optical isolator 106. This second channel of the optical isolator 106 provides an output through an invertor 122 to an output I7 which is connected to another input pin of the field programmable gate array 26.

The input sides of the isolators 80–90 (FIG. 3B) are provided with power through a terminal VDUM (FIG. 3C) by the monitored receiver to which the channel metering attachment 12 is connected. Accordingly, as shown in FIG. 3E, a line 130 is connected at one end to receive power from the monitored receiver 25, and at another end through a filter 132 to a voltage regulator 134. The output of the voltage regulator 134 is connected to the terminal VDUM.

The output sides of the isolators 80–90 (FIG. 3B) are provided with power through terminals VCCA-VCCF by the channel metering attachment 12. As shown in FIGS. 3F and 3H, the terminals VCCA-VCCF connect outputs of a plurality of invertors 140, 142, 144, 146, 148 and 150 to the output sides of corresponding isolators 80–90. The inputs of the invertors 140–150 are connected to corresponding output lines O1–O6 of the field programmable gate array 26. Accordingly, power is provided over the terminal VCCA to the output side of the isolator 80, power is provided over the terminal VCCB to the output side of the isolator 82, power is provided over the terminal VCCC to the output side of the isolator 84, power is provided over the terminal VCCD to the output side of the isolator 86, power is provided over the terminal VCCE to the output side of the isolator 88, and power is provided over the terminal VCCF to the output side of the isolator 90.

The computer 28, and its connections to the field programmable gate array 26, its connections to the home unit 20, and its connections to the programmer 30, are shown in more detail in FIG. 3G. The computer 28 may be a microprocessor, such as a Motorola 68HC811E2 microprocessor. The computer 28, as arranged herein, is capable of operating in an expanded multiplex mode through the use of a demultiplexer 160 shown in FIG. 3I in order to access more memory than is otherwise possible. In this mode, a parallel I/O port C (i.e., pins PC0–PC7) of the computer 28 may act as a low address byte for both the field programmable gate array 26 (see FIG. 3H) and external memory units 162 and 164 (see FIGS. 3I and 3J). The external memory unit 162 may be a 32K byte EEPROM (i.e., 32K×8 bits) and the external memory unit 164 may be a 32K byte RAM (i.e., 32K×8 bits). The parallel I/O port C of the computer 28 may also provide, and receive, an eight bit data byte between itself, the field programmable gate array 26, and the external memory units 162 and 164. A parallel I/O port B (i.e., pins PB0–PB7) of the computer 28 is dedicated to the high address byte for the field programmable gate array 26 and the external memory units 162 and 164.

The falling edge of the address strobe pulse on the AS pin of the computer 28 is used to latch addresses into the field programmable gate array 26 and the demultiplexer 160. This address strobe pulse pulses low, high, and then low again during the low half cycle of the ECCLK clock signal. On the other hand, data is placed on the data bus by the parallel I/O port C of the computer 28 during the high half cycle of the ECCLK clock signal. The parallel I/O ports A and D of the computer 28, in addition to providing for communication between the computer 28, the home unit 20, and the programmer 30, provide control functions between the computer 28 and the field programmable gate array 26.

Figure 3I:
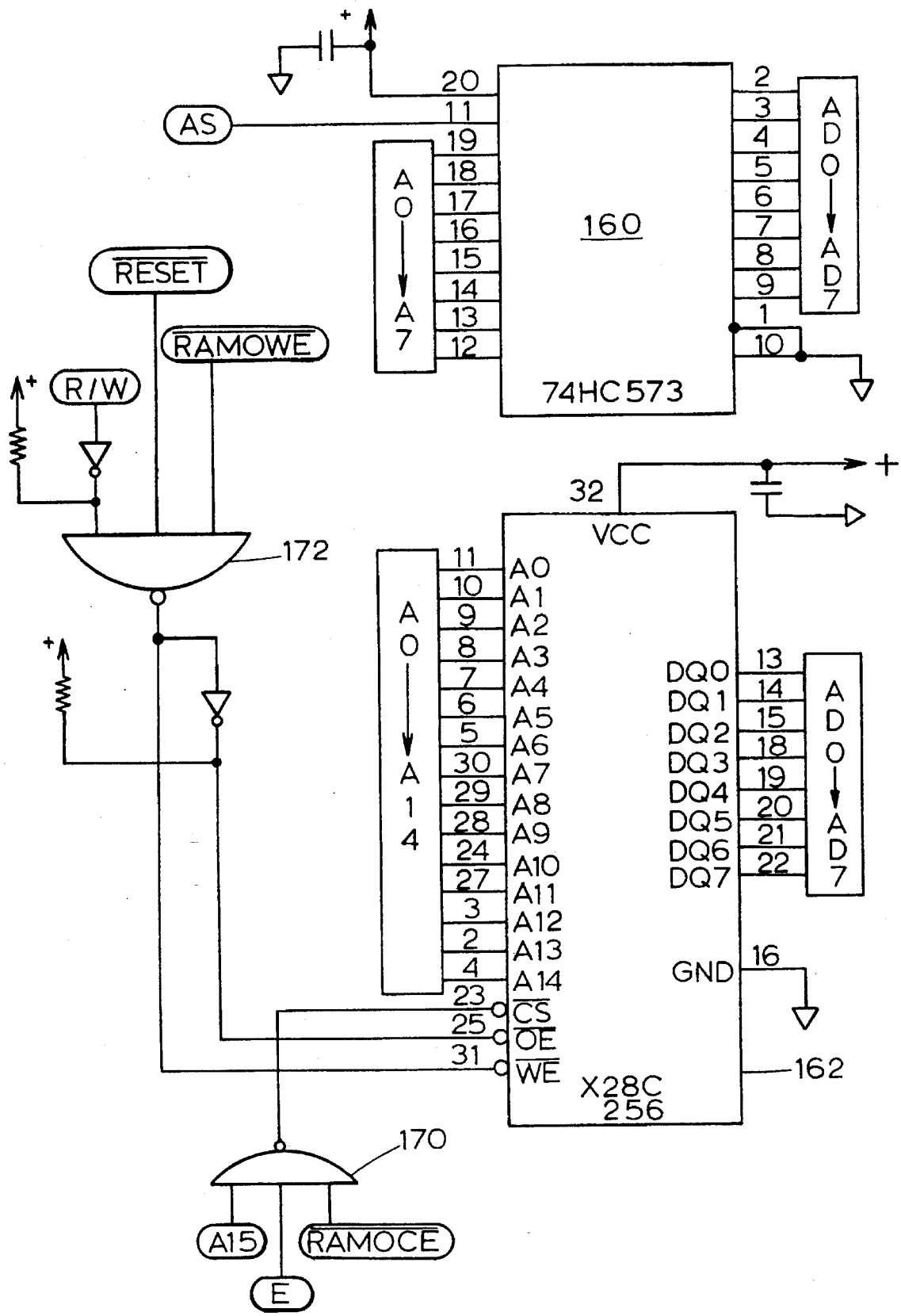
Figure 3J:
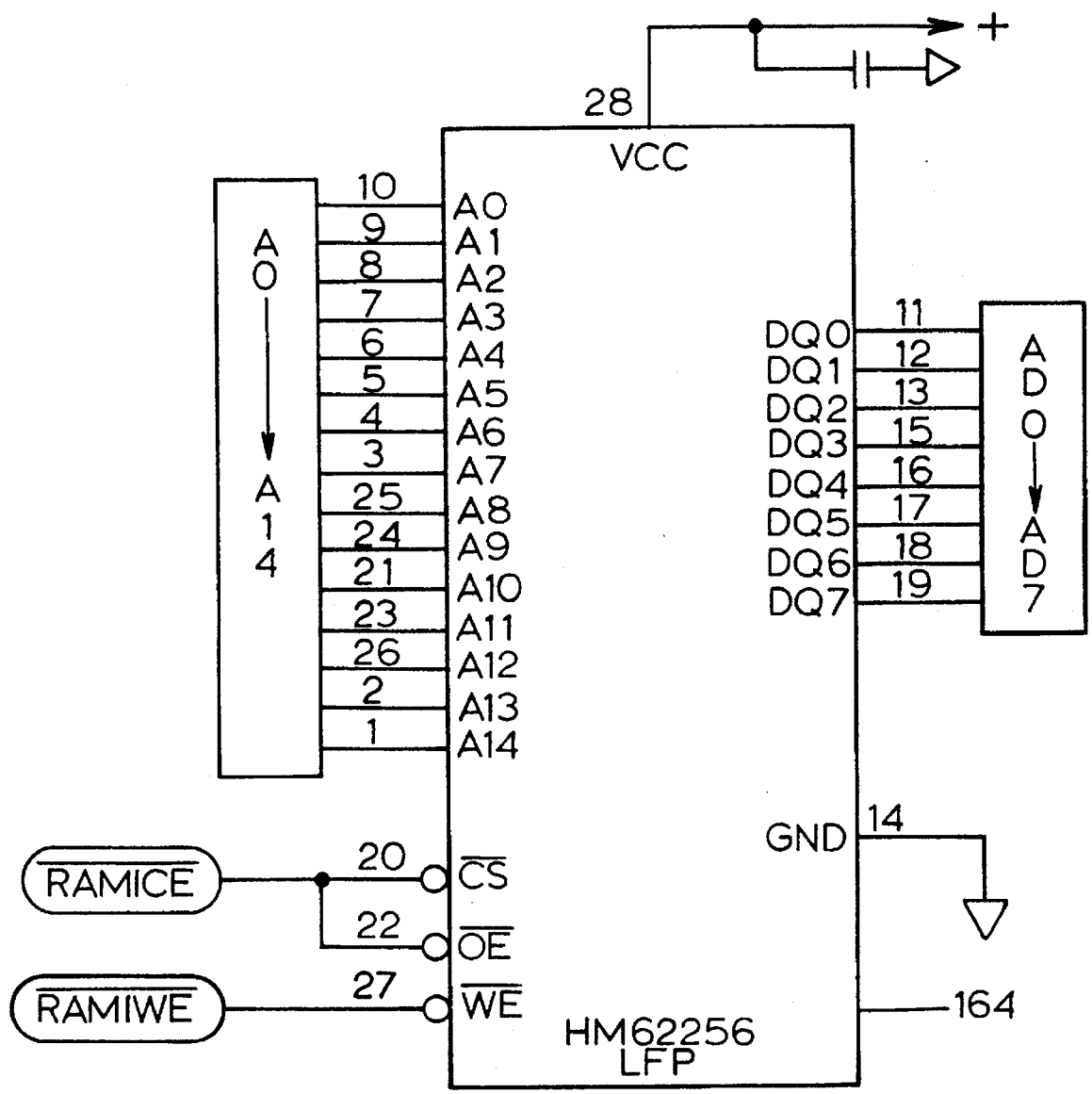

As shown in FIG. 3I, the demultiplexer 160 is used to demultiplex the low address byte and the data byte provided on the parallel I/O port C of the computer 28 under control of the address strobe pin AS. Addresses which appear on the parallel I/O ports B and C of the computer 28 during the low half cycle of the ECCLK clock signal provide addresses A0–A14 to the external memory units 162 and 164. Data on the parallel I/O port C of the computer 28 is transferred between the external memory units 162 and 164 and the field programmable gate array 26 over the data lines AD0–AD7 during the high half cycle of the ECCLK clock signal. The selection between the external memory units 162 and 164 is provided by the glue logic shown in FIGS. 3I and 3J.

The expanded multiplex mode may be selected by the programmer 30. Accordingly, the programmer 30 must hold the BOOT/RESET signal on the line 56 low for at least 8 clock periods of the ECCLK clock signal. At least two clock periods of the ECCLK clock signal before the BOOT/RESET signal from the programmer 30 is released, the mode select pins MODA/MODB must be in the desired state. As long as the BOOT/RESET signal on the line 56 is held low, the mode select pins MODA/MODB are held low. The BOOT/RESET signal on the line 56 must be released at least two microseconds before the signal on the $\overline{\text{RESET}}$ terminal is released. The timing capabilities of PC-DOS (the operating software of the programmer 30) do not allow such precise timing. Consequently, the signal on the $\overline{\text{RESET}}$ terminal must be held long enough to allow for the limitations of DOS. The BOOT/RESET signal on the line 56 is, therefore, held low for about 100 milliseconds to allow the computer 28 to enter the expanded multiplex mode. The delay of the signal on the $\overline{\text{RESET}}$ terminal beyond the release of the BOOT/RESET signal on the line 56 is accomplished by proper selection of capacitors 166 shown in FIG. 3A. The combined value of the capacitors 166 may be, for example, $100 \times 10^{-9}$ farads.

The external memory unit 162 stores both the application software for the channel metering attachment 12 and the programmable logic software for programing the field programmable gate array 26. The configuration of the field programmable gate array 26 to customize it to the particular monitored receiver to which the channel metering attachment 12 is connected is controlled by the computer 28 in accordance with the programming logic software stored in the external memory unit 162. This programming logic software is supplied by the programmer 30 at installation, and is stored in the external memory unit 162 under control of the computer 28. The external memory unit 164 is accessible only after the programmable gate array 26 has been programmed by the programmable logic software stored in the external memory unit 162. Addressing of the external memory unit 162 should be unrestricted on power-up so that data can be both read out of, and written into, its memory locations.

Selection of the external memory unit 162 is provided by a NAND gate 170 of the glue logic, and read/write control is provided by a NAND gate 172 of the glue logic. Chip selection for the external memory unit 164 is provided by the field programmable gate array 26. Thus, channel and status information of the monitored receiver to which the channel metering attachment 12 is connected is decoded by the field programmable gate array 26 under control of the computer 28, and this information is stored in the external memory unit 164. Periodically, the information stored in the external memory unit 164 is accessed by the computer 28, and is supplied to the home unit 20.

The field programmable gate array 26, as shown in more detail in FIG. 3H, may be a Xilinx XC3090PC84, a Xilinx XC3030PC68, a Xilinx XC2064PC68, or the like. The choice of which of these devices is to be used for the field programmable gate array 26 depends upon the desirable size of the field programmable gate array 26. The field programmable gate array 26 is connected to the computer 28, to the external memory units 162 and 164 of the computer 28, and to the isolation circuit 24 by the terminals shown in FIG. 3H. Appendix A shows how the field programmable gate array 26 may be programmed to customize the channel metering attachment 12 for a Zenith digital television which uses an Intermetall bus. LEDs 190 are connected to the field programmable gate array 26.

Figure 4:
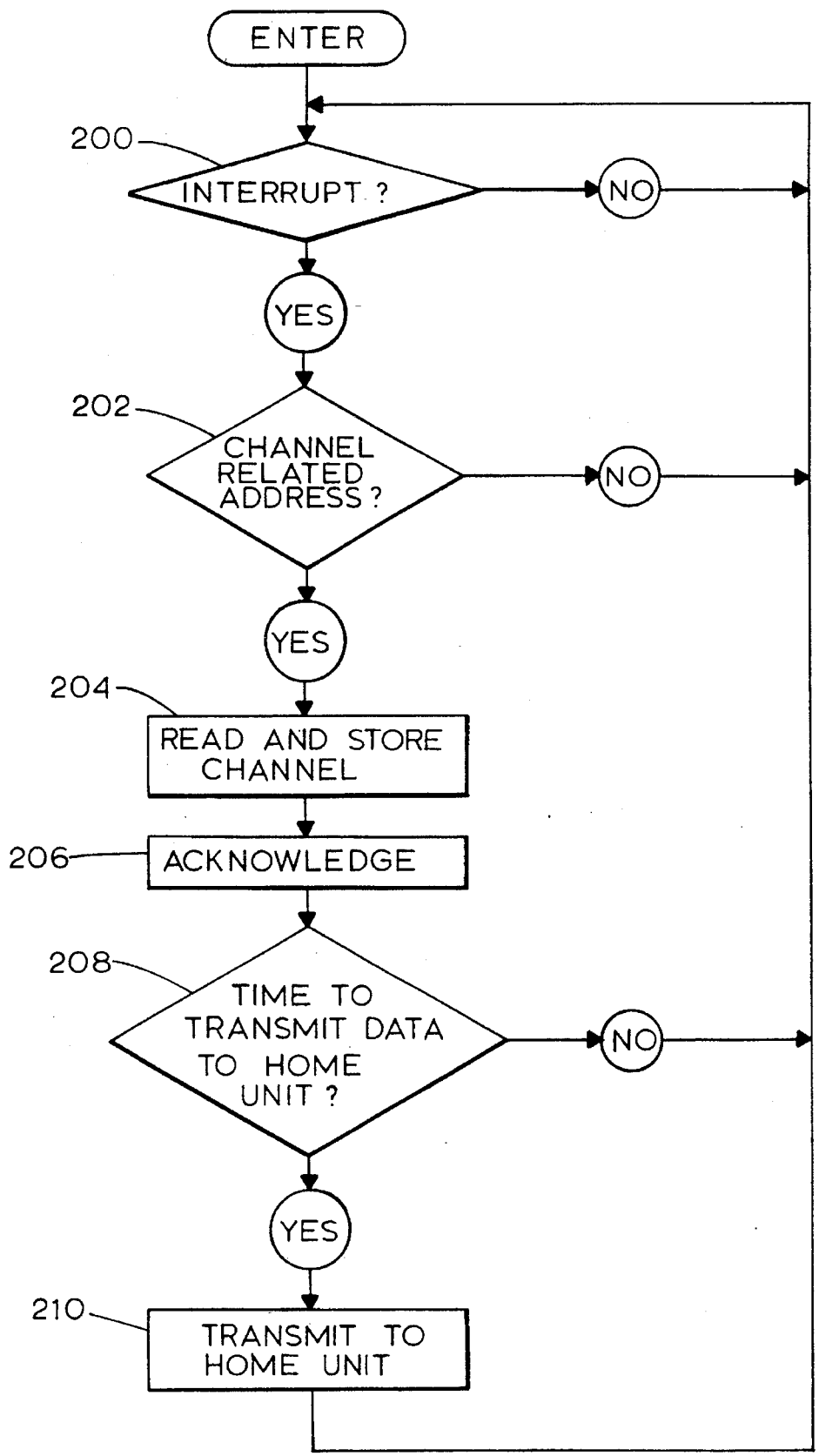
FIG. 4 is a flow chart illustrating the channel determining functions of the channel metering attachment shown in FIGS. 3A–3J; and, FIGS. 5–7 show examples of serial data communication buses currently used by digital receivers.

A flow chart for the application software stored in the external memory unit 162 is shown in FIG. 4. After the field programmable gate array 26 has been configured, and the computer 28 has been initialized so that the channel metering attachment 12 begins metering the monitored receiver to which it is connected, a block 200 determines whether an interrupt has been provided by the field programmable gate array 26. When a complete data packet from the serial data communication bus of the monitored receiver to which the channel metering attachment 12 is connected has been captured by a captured data register of the field programmable gate array 26, an interrupt is provided by the field programmable gate array 26 to the computer 28. If such an interrupt has not been provided, a complete data packet has not yet been captured by the captured data register of the field programmable gate array 26, and the computer 28 merely waits for an interrupt to be supplied to it by the field programmable gate array 26.

When such an interrupt is supplied to the computer 28 by the field programmable gate array 26, a block 202 tests the data packet captured by the captured data register of the field programmable gate array 26 to determine whether the data packet contains an address indicating that the data in the data packet relates either to the status of the monitored receiver 25 or to the channel to which the monitored receiver 25 is tuned. For example, the block 202 may test the data packet captured by the captured data register of the field programmable gate array 26 to determine whether the address contained in the data packet is the address of the tuner of the monitored receiver 25. If this address is the address of the tuner, then the data following that address is channel data instructing the tuner which channel has been selected. Alternatively, or additionally, since many monitored receivers provide digital displays of the channels to which the tuners of the monitored receivers are tuned, the block 202 may test to determine whether the address in the data packet captured by the captured data register of the field programmable gate array 26 is the address of the display which digitally displays the channel number of the selected channel. If so, the data information following the display address in the data packet captured by the captured data register of the field programmable gate array 26 is channel information.

If the address in the data packet captured by the captured data register of the field programmable gate array 26 does not indicate that the data packet also contains channel (or status) information, then the computer 28 waits for the next interrupt from the field programmable gate array 26. On the other hand, if the address in the data packet captured by the captured data register of the field programmable gate array 26 does indicate that the data packet also contains channel (or status) information, a block 204 causes that channel (or status) information contained in the data packet to be read and stored in the external memory unit 164. If the data packet also includes the address of the component within the monitored receiver 25 which is the source of data packet, the block 204 may also cause that address to be read in order to identify the source of the data packet.

Thereafter, a block 206 causes the computer 28 to supply an acknowledgement to the field programmable gate array 26. This acknowledgement clears the captured data packet from the captured data register of the field programmable gate array 26.

A block 208 then determines whether it is time to transmit the information stored in the external memory unit 164 to the home unit 20. If it is not yet time to transmit that information, the program returns to wait for the next interrupt to be supplied to the computer 28 by the field programmable gate array 26. On the other hand, if it is time to transmit the information stored in the external memory unit 164 to the home unit 20, a block 210 causes that information to be accessed from the external memory unit 164 and to be transmitted to the home unit 20.

Figure 5:
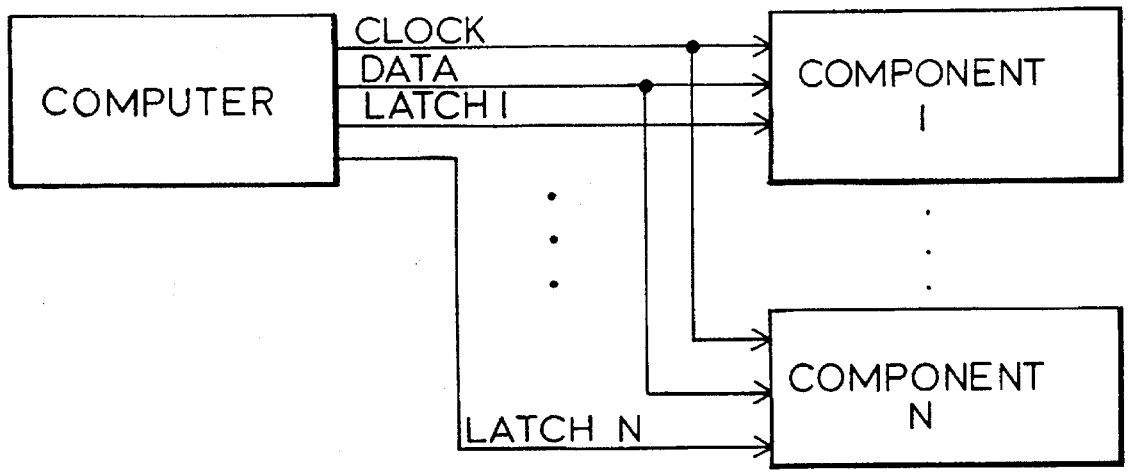
Figure 6:
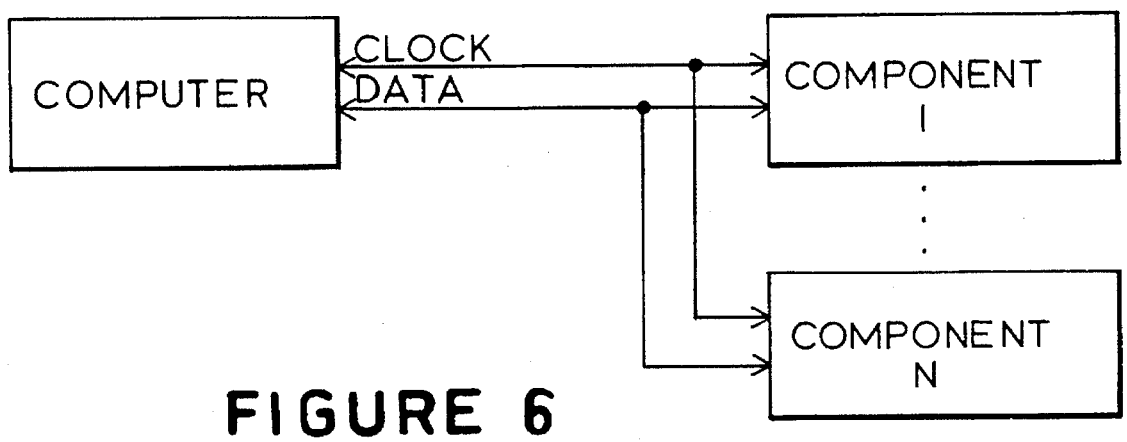
Figure 7:
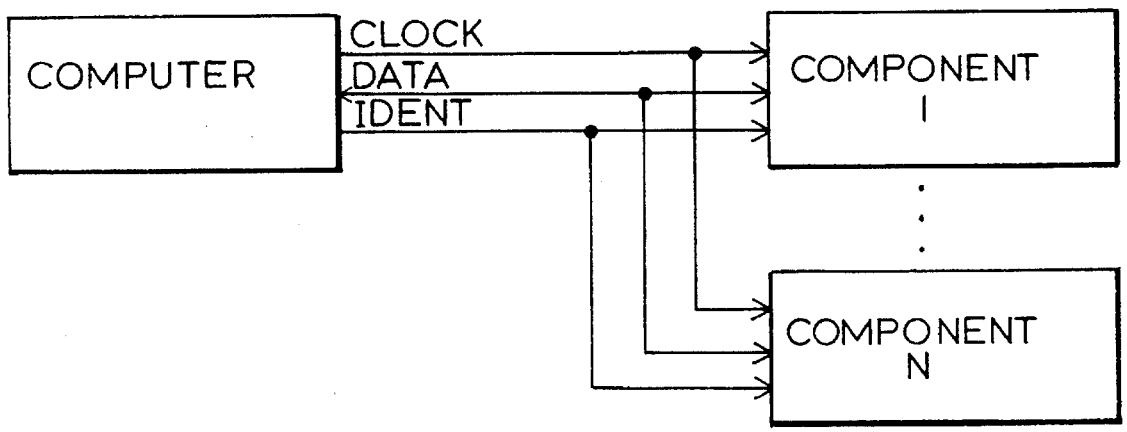

FIGS. 5–7 show examples of the serial data communication bus arrangements used in digital receivers. For example, some receivers use a latching serial shift register bus configuration as shown in FIG. 5 wherein a computer, such as a microcontroller, communicates with various components 1-N of a receiver over a serial data communication bus which includes a clock line, a data line, and latch lines 1-N. Accordingly, each line of the serial data communication bus shown in FIG. 5 is connected to a corresponding input of the isolators 80–90.

An inter integrated circuit (I$^2$C) bus used by certain Phillips digital receivers is shown in FIG. 6. The I$^2$C bus includes a clock line and a data line. Accordingly, each line of the I$^2$C bus shown in FIG. 6 is connected to a corresponding input of the isolators 80–90. Therefore, two of the inputs of the isolators 80–90 are used to connect the channel metering attachment 12 to the I$^2$C bus shown in FIG. 6.

The Intermetall (IM) bus of IIT is shown in FIG. 7. This bus includes a clock line, a data line, and an Ident line. The Ident line of the IM bus is held low during the address portion of the data packets carried on the data line. Each line of the IM bus shown in FIG. 7 is connected to a corresponding input of the isolators 80–90. Therefore, three of the inputs of the isolators 80–90 are used to connect the channel metering attachment 12 to the IM bus shown in FIG. 7.

Accordingly, the channel metering attachment 12 is capable of monitoring serial data communication buses of digital receivers in order to determine the channels to which the receivers are tuned. The channel metering attachment 12 is also programmable so as to be customized to the different serial data communication bus and data structures used by digital receivers. Modifications of the attachment according to the present invention may be made without departing from the scope of the invention as will be apparent to those skilled in the art.

We claim:

1. An attachment for metering channels to which a receiver is tuned, the receiver having a serial data communication bus for carrying serial data between components of the receiver, the attachment comprising:

channel determining means for determining a channel to which the receiver is tuned, the channel determining means determining the channel in response to the serial data;

connecting means for connecting the channel determining means to the serial data communication bus of the receiver; and, means connected to the channel determining means for carrying an output identifying the channel to which the receiver is tuned.

2. The attachment of claim 1 wherein the channel determining means comprises means for reading an address from the serial data and for reading channel data associated with the address if the address indicates that data associated with the address is channel data.

3. The attachment of claim 2 wherein the connecting means comprises isolating means for isolating the channel determining means from the serial data communication bus of the receiver.

4. The attachment of claim 2 wherein the connecting means comprises a plurality of line connecting means for connecting the channel determining means to a selectable number of lines of the serial data communication bus.

5. The attachment of claim 4 wherein at least two lines of the plurality of line connecting means operate at different data rates.

6. The attachment of claim 5 wherein each line connecting means of the plurality of line connecting means comprises isolating means for isolating the channel determining means from the lines of the serial data communication bus.

7. The attachment of claim 1 wherein the connecting means comprises a plurality of line connecting means for connecting the channel determining means to a selectable number of lines of the serial data communication bus.

8. The attachment of claim 7 wherein at least two lines of the plurality of line connecting means operate at different data rates.

9. A metering system comprising:

receiving means for receiving a plurality of broadcast signals over a corresponding plurality of channels, the receiving means having a serial data communication bus for carrying serial data between components of the receiving means;

channel determining means for determining a channel to which the receiving means is tuned, the channel determining means determining the channel in response to the serial data;

connecting means for connecting the channel determining means to the serial data communication bus of the receiving means; and, means connected to the channel determining means for carrying an output identifying the channel to which the receiving means is tuned.

10. The attachment of claim 9 wherein the channel determining means comprises means for reading an address from the serial data and for reading channel data associated with the address if the address indicates that data associated with the address is channel data.

11. The attachment of claim 10 wherein the connecting means comprises isolating means for isolating the channel determining means from the serial data communication bus of the receiving means.

12. The attachment of claim 10 wherein the connecting means comprises a plurality of line connecting means for connecting the channel determining means to a selectable number of lines of the serial data communication bus.

13. The attachment of claim 12 wherein at least two lines of the plurality of line connecting means operate at different data rates.

14. The attachment of claim 13 wherein each line connecting means of the plurality of line connecting means comprises isolating means for isolating the channel determining means from the lines of the serial data communication bus.

15. An attachment for metering channels to which a selected receiver is tuned, the selected receiver being selected from among a plurality of different receivers, each of the plurality of different receivers having a unique serial data communication bus for carrying serial data between components thereof, the attachment comprising:

channel determining means for determining a channel to which the selected receiver is tuned, the channel determining means determining the channel in response to the serial data carried by the serial data communication bus of the selected receiver;

connecting means for connecting the channel determining means to the serial data communication bus of the selected receiver;

customizing means connected to the channel determining means and to the connecting means for customizing the attachment to the selected receiver so that the serial data of the selected receiver can be decoded by the attachment; and, means connected to the channel determining means for carrying an output identifying the channel to which the selected receiver is tuned.

16. The attachment of claim 15 wherein the connecting means comprises a plurality of line connecting means for connecting the channel determining means to a selectable number of lines of the serial data communication bus, the selectable number being dependent upon which of the plurality of different receivers is selected as the selected receiver.

17. The attachment of claim 16 wherein the customizing means comprises a programmable gate array.

18. The attachment of claim 17 wherein the channel determining means comprises storing means for storing a program for programming the programmable gate array so that the programmable gate array is customized to the selected receiver.

19. The attachment of claim 15 wherein the channel determining means comprises means for reading an address from the serial data and for reading channel data associated with the address if the address indicates that data associated with the address is channel data.

20. The attachment of claim 19 wherein the customizing means comprises a programmable gate array.

21. The attachment of claim 20 wherein the channel determining means comprises storing means for storing a program for programming the programmable gate array so that the programmable gate array is customized to the selected receiver.

22. The attachment of claim 21 wherein the connecting means comprises a plurality of line connecting means for connecting the channel determining means to a selectable number of lines of the serial data communication bus, the selectable number being dependent upon which of the plurality of different receivers is selected as the selected receiver.

23. The attachment of claim 22 wherein the connecting means comprises isolating means for isolating the channel determining means from the serial data communication bus of the selected receiver.

24. The attachment of claim 22 wherein at least two lines of the plurality of line connecting means operate at different data rates.

25. The attachment of claim 24 wherein each line connecting means of the plurality of line connecting means comprises isolating means for isolating the channel determining means from the lines of the serial data communication bus of the selected receiver.

26. The attachment of claim 15 wherein the means for carrying an output is connected to a home unit, the home unit receiving the output identifying the channel to which the selected receiver is tuned.

27. The attachment of claim 15 wherein the connecting means comprises first connecting means for connecting the channel determining means to the serial data communication bus of the selected receiver, wherein the connecting means further comprises second connecting means for connecting the channel determining means to an installation port so that the customizing means may be customized by an installer.

28. The attachment of claim 27 wherein the customizing means comprises a programmable gate array.

29. The attachment of claim 28 wherein the channel determining means comprises storing means for storing a program for programming the programmable gate array so that the programmable gate array is customized to the selected receiver.

30. The attachment of claim 29 wherein the connecting means further comprises third connecting means for connecting the channel determining means to an indicator means for indicating selected functions to a user.

31. The attachment of claim 30 wherein the means for carrying an output is connected to a home unit, the home unit receiving the output identifying the channel to which the selected receiver is tuned.

32. The attachment of claim 15 wherein the customizing means comprises a programmable gate array.

33. The attachment of claim 32 wherein the channel determining means comprises storing means for storing a program for programming the programmable gate array so that the programmable gate array is customized to the selected receiver.

34. The attachment of claim 15 wherein the channel determining means comprises storing means for storing a program for programming the customizing means so that the customizing means is customized to the selected receiver.

35. The attachment of claim 15 wherein the channel determining means comprises means for determining, from the serial data carried by the serial data bus, an address of a component of the selected receiver.

36. The attachment of claim 35 wherein the address is an address of a component which is a source of the serial data from which the address is determined.

* * * * *